United States Patent
Liu et al.

(10) Patent No.: US 8,457,393 B2
(45) Date of Patent: Jun. 4, 2013

(54) CROSS-COLOR IMAGE PROCESSING SYSTEMS AND METHODS FOR SHARPNESS ENHANCEMENT

(75) Inventors: Guansong Liu, San Jose, CA (US); Jizhang Shan, Cupertino, CA (US); Lu Gao, San Jose, CA (US); Hongjun Li, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 148 days.

(21) Appl. No.: 13/179,488

(22) Filed: Jul. 9, 2011

(65) Prior Publication Data

US 2012/0014591 A1 Jan. 19, 2012

Related U.S. Application Data

(60) Provisional application No. 61/364,272, filed on Jul. 14, 2010.

(51) Int. Cl.
*G06K 9/00* (2006.01)

(52) U.S. Cl.
USPC ......................................................... 382/162

(58) Field of Classification Search
USPC ................. 382/162, 167, 260, 274, 275, 286; 348/222.1, 227.1, 294
See application file for complete search history.

(56) References Cited

U.S. PATENT DOCUMENTS

| | | | |
|---|---|---|---|
| 4,808,501 A | 2/1989 | Chiulli | |
| 5,096,801 A | 3/1992 | Koya et al. | |
| 5,748,371 A | 5/1998 | Cathey, Jr. et al. | |
| 6,711,302 B1* | 3/2004 | Lee | 382/275 |
| 7,218,448 B1 | 5/2007 | Cathey, Jr. et al. | |
| 7,260,251 B2 | 8/2007 | Dowski, Jr. et al. | |
| 7,379,613 B2 | 5/2008 | Dowski, Jr. et al. | |
| 7,436,595 B2 | 10/2008 | Cathey, Jr. et al. | |
| 7,751,619 B2* | 7/2010 | Kawanishi et al. | 382/167 |
| 2005/0259162 A1* | 11/2005 | Shan | 348/227.1 |
| 2005/0259886 A1* | 11/2005 | Shan | 382/260 |
| 2009/0213321 A1 | 8/2009 | Galstian et al. | |
| 2009/0316097 A1 | 12/2009 | Presniakov et al. | |
| 2010/0007807 A1 | 1/2010 | Galstian et al. | |

OTHER PUBLICATIONS

File History of U.S. Appl. No. 13/323,394; Title of Invention: Imaging System and Method having Extended Depth of Field; filed Dec. 12, 2011.
File History of U.S. Appl. No. 13/149,707; Title of Invention: System and Method for Extending Depth of Filed in a Lens System by use of Color-Dependent Wavefront Coding; filed May 31, 2011.

(Continued)

*Primary Examiner* — Duy M Dang
(74) *Attorney, Agent, or Firm* — Lathrop & Gage LLP

(57) ABSTRACT

Systems and methods for processing a detected composite color image to form a processed composite color image includes the following, for each of a plurality of pixels in the image: (1) identifying a window of pixels in the image that surrounds the pixel, (2) calculating a weight factor coefficient for each detected color from detected color intensity values of the pixels that surround the pixel, (3) calculating raw color contributions corresponding to each nonselected color, (4) multiplying each of the detected color values of a selected color and the raw color contributions corresponding to the nonselected colors, with corresponding weight factor coefficients, to form weighted color contributions, and (5) summing the weighted color contributions to form a processed color intensity value for the pixel.

17 Claims, 8 Drawing Sheets

OTHER PUBLICATIONS

"Wiener Restoration of Sampled Image Data: End-to-End Analysis", by Carl L. Fales, et al., J. Opt. Soc. Am. A/vol. 5, No. 3, pp. 300-314, Mar. 1988.

"Extended Depth of Field Through Wave-Front Coding", by Edward R. Dowski, Jr., et al., Applied Optics, vol. 34, No. 11, pp. 1659-1866, Apr. 10, 1995.

"New Paradigm for Imaging Systems", by W. Thomas Cathey et al., Applied Optics, vol. 41, No. 29, pp. 6080-6092, Oct. 10, 2002.

"Iris Recognition at a Distance with Expanded Imaging Volume", by Ramkumar Narayanswamy, et al., CDM Optics, Inc., 12 pages, Proc. SPIE 6202, Biometric Technology for Human Identification III, 62020G (Apr. 17, 2006).

"Spectral Focal Sweep: Extended Depth of Field from Chromatic Aberrations", by O. Cossairt, et al., IEEE International Conference on Computational Photography (ICCP), Mar. 2010.

"Extended Depth-of-Field (EDoF) Using Sharpness Transport Across Colour Channels", by Christel-Loic Tisse, et al., 2008.

\* cited by examiner

| 44 | | | | | | | | | |
|---|---|---|---|---|---|---|---|---|---|
| B11 | G12 | B13 | G14 | B15 | G16 | B17 | G18 | B19 | G110 |
| G21 | R22 | G23 | R24 | G25 | R26 | G27 | R28 | G29 | R210 |
| B31 | G32 | B33 | G34 | B35 | G36 | B37 | G38 | B39 | G310 |
| G41 | R42 | G43 | R44 | G45 | R46 | G47 | R48 | G49 | R410 |
| B51 | G52 | B53 | G54 | B55 | G56 | B57 | G58 | B59 | G510 |
| G61 | R62 | G63 | R64 | G65 | R66 | G67 | R68 | G69 | R610 |
| B71 | G72 | B73 | G74 | B75 | G76 | B77 | G78 | B79 | G710 |
| G81 | R82 | G83 | R84 | G85 | R86 | G87 | R88 | G89 | R810 |
| B91 | G92 | B93 | G94 | B95 | G96 | B97 | G98 | B99 | G910 |
|  | R102 |  | R104 |  | R106 |  | R108 |  | R1010 |

| R11 | G12 | R13 | G14 | R15 | G16 | R17 | G18 | R19 |
|-----|-----|-----|-----|-----|-----|-----|-----|-----|
| G21 | B22 | G23 | B24 | G25 | B26 | G27 | B28 | G29 |
| R31 | G32 | R33 | G34 | R35 | G36 | R37 | G38 | R39 |
| G41 | B42 | G43 | B44 | G45 | B46 | G47 | B48 | G49 |
| R51 | G52 | R53 | G54 | R55 | G56 | R57 | G58 | R59 |
| G61 | B62 | G63 | B64 | G65 | B66 | G67 | B68 | G69 |
| R71 | G72 | R73 | G74 | R75 | G76 | R77 | G78 | R79 |
| G81 | B82 | G83 | B84 | G85 | B86 | G87 | B88 | G89 |
| R91 | G92 | R93 | G94 | R95 | G96 | R97 | G98 | R99 |

| G11 | B12 | G13 | B14 | G15 | B16 | G17 | B18 | G19 |
| --- | --- | --- | --- | --- | --- | --- | --- | --- |
| R21 | G22 | R23 | G24 | R25 | G26 | R27 | G28 | R29 |
| G31 | B32 | G33 | B34 | G35 | B36 | G37 | B38 | G39 |
| R41 | G42 | R43 | G44 | R45 | G46 | R47 | G48 | R49 |
| G51 | B52 | G53 | B54 | G55 | B56 | G57 | B58 | G59 |
| R61 | G62 | R63 | G64 | R65 | G66 | R67 | G68 | R69 |
| G71 | B72 | G73 | B74 | G75 | B76 | G77 | B78 | G79 |
| R81 | G82 | R83 | G84 | R85 | G86 | R87 | G88 | R89 |
| G91 | B92 | G93 | B94 | G95 | B96 | G97 | B98 | G99 |

| G11 | R12 | G13 | R14 | G15 | R16 | G17 | R18 | G19 |
|-----|-----|-----|-----|-----|-----|-----|-----|-----|
| B21 | G22 | B23 | G24 | B25 | G26 | B27 | G28 | B29 |
| G31 | R32 | G33 | R34 | G35 | R36 | G37 | R38 | G39 |
| B41 | G42 | B43 | G44 | B45 | G46 | B47 | G48 | B49 |
| G51 | R52 | G53 | R54 | G55 | R56 | G57 | R58 | G59 |
| B61 | G62 | B63 | G64 | B65 | G66 | B67 | G68 | B69 |
| G71 | R72 | G73 | R74 | G75 | R76 | G77 | R78 | G79 |
| B81 | G82 | B83 | G84 | B85 | G86 | B87 | G88 | B89 |
| G91 | R92 | G93 | R94 | G95 | R96 | G97 | R98 | G99 |

FIG. 6

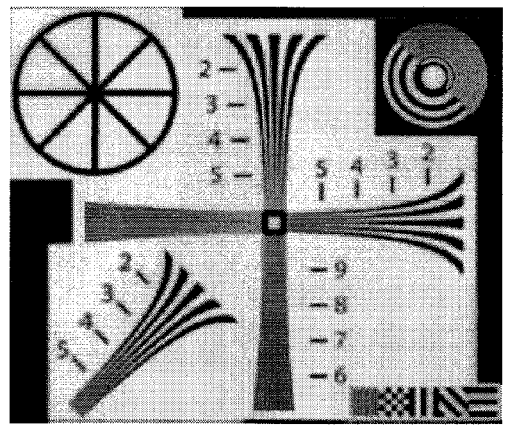
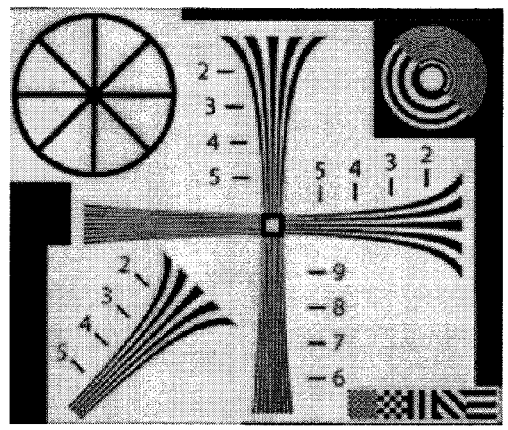
FIG. 9(A)                    FIG. 9(B)
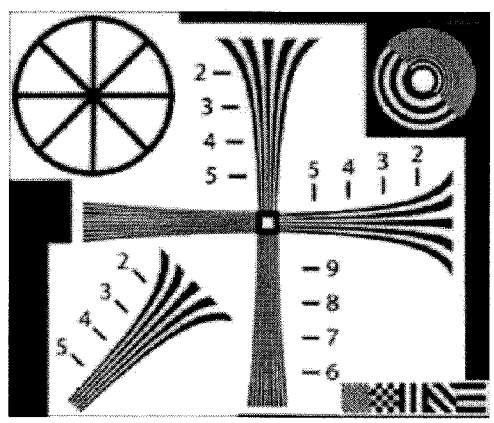
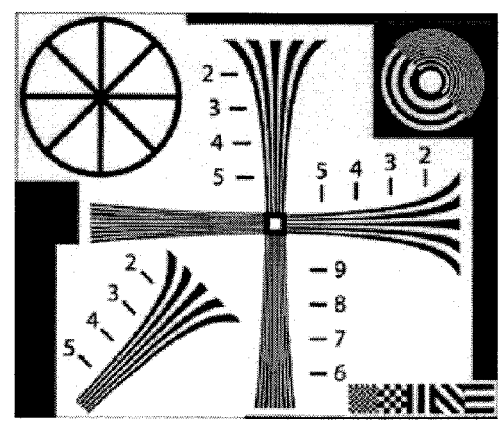
FIG. 10(A)                   FIG. 10(B)

CROSS-COLOR IMAGE PROCESSING SYSTEMS AND METHODS FOR SHARPNESS ENHANCEMENT

RELATED APPLICATIONS

This application claims priority to U.S. Provisional Application Ser. No. 61/364,272 (hereinafter "'272 provisional"), filed 14 Jul. 2010, which is incorporated herein by reference.

BACKGROUND

An imager module includes at least a lens and an image sensor. An image detected by the image sensor is displayed on a display. Typically, the image sensor has three types of detector elements, each element providing a color intensity value for a primary color (e.g., one of red (R), green (G), and blue (B)) and accordingly the sensor provides R, G, and B individual color images to the display, each individual color image being a composite of pixels that have color intensity values for each of the colors.

In some circumstances, the lens has chromatic aberration resulting in differences in the primary color pixels. Accordingly, individual R, G, and B color images formed by the lens are not on the same focal plane. If the position of the image sensor is adjusted to optimize the R image, the detected R image will be sharp while the detected G and B images are not.

To make all R, G, and B images sharp, the detected R, G, and B images are sometimes processed and electronically restored before they are forwarded to the display. Various methods are used to correct the less sharp images using information gained from the sharpest image. It is appreciated that some methods attempt to find the sharpest image (among R, G, and B) in order to restore the images which are less sharp. In general, these methods relate to cross-color image processing for sharpness enhancement.

In the existing art, these cross-color image processing methods are complicated and not always accurate. For example, depending on the distance of the object to the imager, the sharpest image among R, G, and B can vary. That is, in a single image, the sharpest individual color image (R, G, or B) for near objects differs from the sharpest individual color image (R, G, or B) for far objects; thus a single sharpest individual color image (R, G, or B) in a single composite color image cannot be defined. Although certain cross-color image processing difficulties may be solved using alternative approaches—for example, by partitioning the image into several regions—a long computational process results.

SUMMARY

In an embodiment, a method for processing a detected composite color image to form a processed composite color image includes detecting the detected composite color image as a plurality of individual color images, each individual color image comprising detected color intensity values for one of a plurality of detected colors, for each of a plurality of pixels in the image. The method also includes identifying a window of pixels in the image that surrounds the pixel and calculating a weight factor coefficient for each detected color from detected color intensity values of the pixels that surround the pixel. The method also includes calculating raw color contributions corresponding to each nonselected color, multiplying each of the detected color values of a selected color and the raw color contributions corresponding to the nonselected colors, with corresponding weight factor coefficients, to form weighted color contributions, and summing the weighted color contributions to form a processed color intensity value for the pixel.

In an embodiment, a method for processing a detected composite color image to form a processed composite color image includes the following for each of a plurality of pixels in the image: (1) identifying a window of pixels in the image that surrounds the pixel, (2) calculating a weight factor coefficient for each detected color from detected color intensity values of the pixels that surround the pixel, (3) calculating raw color contributions corresponding to each nonselected color, (4) multiplying each of the detected color values of a selected color and the raw color contributions corresponding to the nonselected colors, with corresponding weight factor coefficients, to form weighted color contributions, and (5) summing the weighted color contributions to form a processed color intensity value for the pixel.

In an embodiment, an image sensor includes an imaging optical element, an image sensor, and an image processor. The image processor implements a process that forms a processed composite color image from a detected composite color image from the image sensor. The process includes the following steps for each pixel of the detected composite color image: 1) identifying a window of pixels in the image that surrounds the pixel, (2) calculating a weight factor coefficient for each detected color from detected color intensity values of the pixels that surround the pixel, (3) calculating raw color contributions corresponding to each nonselected color, (4) multiplying each of the detected color values of a selected color and the raw color contributions corresponding to the nonselected colors, with corresponding weight factor coefficients, to form weighted color contributions, and (5) summing the weighted color contributions to form a processed color intensity value for the pixel.

BRIEF DESCRIPTION OF THE FIGURES

FIG. 3 shows one exemplary 9×9 window for modifying a B pixel value at the center of window.

FIG. 4 shows one exemplary 9×9 window for modifying a R pixel value at the center of window.

FIG. 5 shows one exemplary 9×9 window for modifying a G pixel value having horizontal R neighboring pixels at the center of window.

FIG. 6 shows one exemplary 9×9 window for modifying a G pixel value having horizontal B neighboring pixels at the center of window.

FIG. 9(a) shows one exemplary red image before processing.

FIG. 9(b) shows the red image of FIG. 9(a) after processing.

FIG. 10(a) shows one exemplary color input image before processing.

FIG. 10(b) shows the color image of FIG. 10(a) after processing.

DETAILED DESCRIPTION OF THE FIGURES

Figure 1:
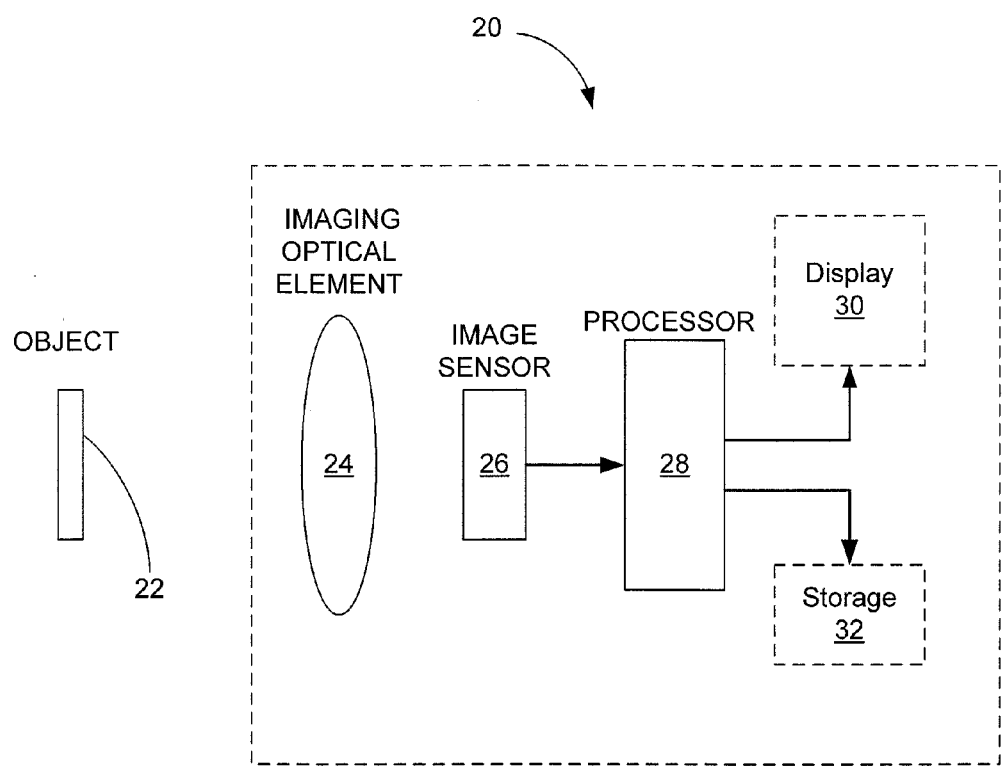
FIG. 1 illustrates one cross-color processing system for sharpness enhancement.

Disclosed herein are cross-color image processing systems and methods for sharpness enhancement that utilize computational processes that do not require searching for the sharpest color image. For example, a color image sensor has R, G, and B pixels forming individual R, G, and B color images. One of the individual R, G, and B color images may be sharp, while the other two images may not be sharp. The information gained from the sharpest image may be used to restore less sharp images; however, it is often unknown which one of R, G, and B is the sharpest image.

In an embodiment, a pixel of the first color is modified such that its final processed color intensity value is a linear combination of its detected color intensity value, a value derived from detected color intensity values of pixels of the second color in a window, and a value derived from detected color intensity values of pixels of the third color in the window, having a first coefficient, a second coefficient, and a third coefficient, respectively. The first coefficient is proportional to the mean gradient of pixels of the first color in the window, the second coefficient is proportional to the mean gradient of pixels of the second color in the window, and the third coefficient is proportional to the mean gradient of pixels of the third color in the window.

The window is for example a 9×9 window, and the pixel to be modified is for example at the center of the window. The window is then shifted by moving the center pixel to the next pixel, which may be a different color. The process is repeated for all or most pixels except an adjustment is made for different pixel structures in the window.

Accordingly, individual processed R, G, and B images will have large mean gradients, or will be sharp in the processed composite color image, even though there is no determination of the sharpest R, G, and B image, resulting in a reduced computational burden for an image processor, as compared to prior art cross-color image processing. The linear combination of contributions from the detected, individual color images of all three colors improves the sharpness of the final processed composite color image while also preventing loss of original information for each individual color image.

In another embodiment, the first coefficient is proportional to the magnitude of the inner product of a high frequency mask and the detected color intensity values of the first color pixels in the window, the second coefficient is proportional to the magnitude of the inner product of the high frequency mask and the detected color intensity values of the second color pixels in the window, and the third coefficient is proportional to the magnitude of the inner product of the high frequency mask and the detected color intensity values of the third color pixels in the window.

In yet another embodiment, the first coefficient is proportional to the local contrast of the detected color intensity values of the first color pixels in the window, the second coefficient is proportional to the local contrast of the detected color intensity values of the second color pixels in the window, and the third coefficient is proportional to the local contrast of the detected color intensity values of the third color pixels in the window.

FIG. 1 shows a cross-color processing system 20 taking a picture of an object 22. System 20 has an imaging optical element 24, an image sensor 26, a processor 28, and an optional display 30 and an optional storage unit 32. Imaging optical element 24 optically forms an image of object 22 on image sensor 26. Imaging optical element 24 may be a simple lens, a compound lens, a specially designed lens including a lens having artificially excessive chromatic aberration, a diffractive optical element (DOE), combinations thereof, or any structure that optically forms an image of an object.

Image sensor 26 detects and converts light intensity into electrical signals representing detected color intensity values. Image sensor 26 is for example a CMOS image sensor formed as an array of detector elements. Each detector element provides color intensity value corresponding to the light intensity at a particular point within an image formed by imaging optical element 24. The set of color intensity values for all three colors at a given point within the image is referred to herein as a "pixel" and the sum of all pixels is referred to as a "composite image." Processor 28 processes the electrical signals corresponding to a detected composite color image from image sensor 26, to form a processed composite color image. Display 30, if included in system 20, may display the processed composite color image. The processed composite color image from processor 28 may also be stored in storage unit 32, if included in system 20.

Figure 2:
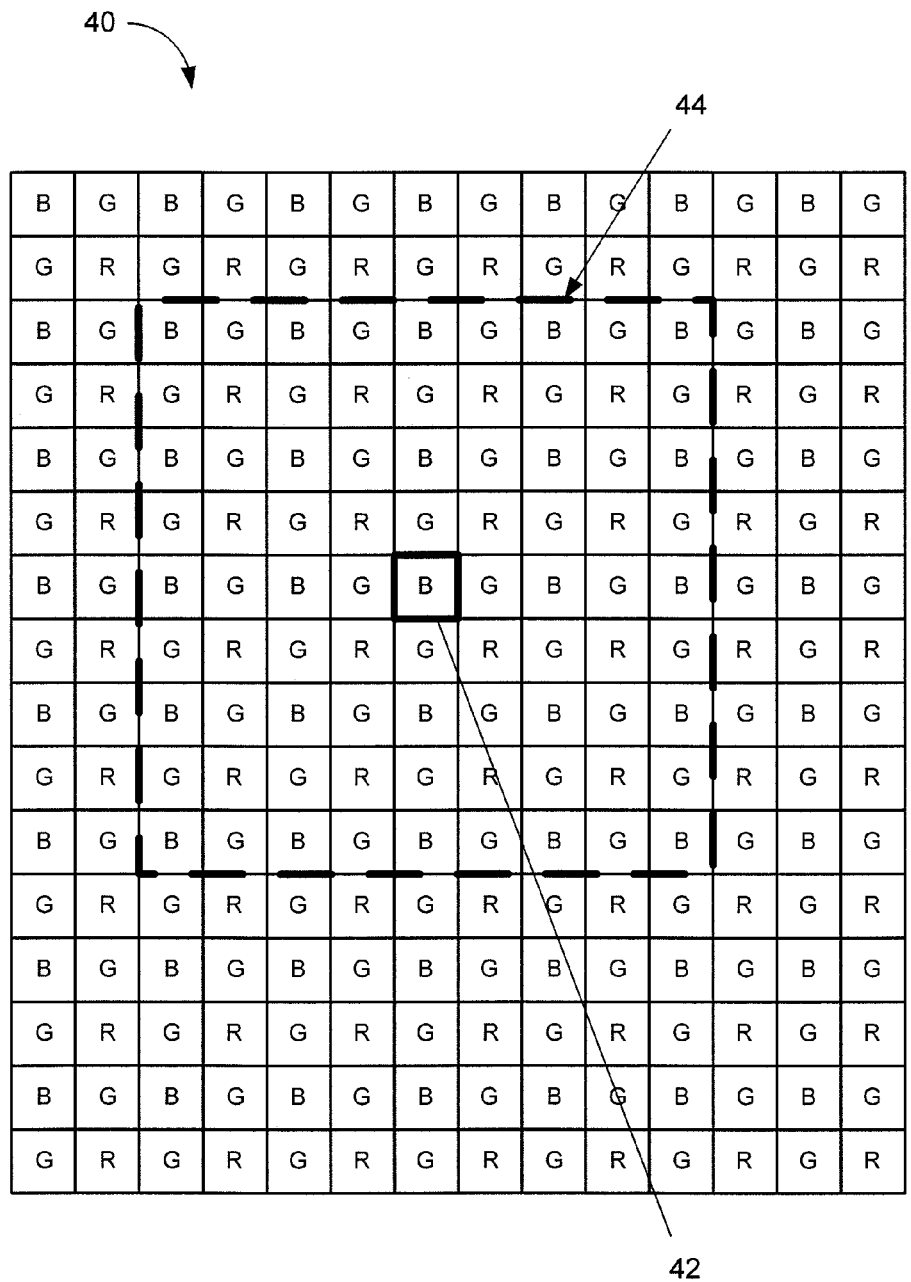
FIG. 2 shows one exemplary pixel array.

Image sensor 26 is formed of a detector element array. In one example, the detector elements are arranged in a plurality of columns and rows as illustrated in FIG. 2. There may be hundreds or thousands of columns and rows in image sensor 26. Detector elements of image sensor 26 coverts light intensity incident onto it into an electrical signal representing a detected color intensity value at the corresponding location of the image being detected. Each detector element is sensitive to a color, such as red (R), green (G), or blue (B). The detector elements may, alternatively be sensitive to a different set of colors, such as cyan (C), magenta (M), and yellow (Y), or other colors. The color sensitivity of a detector element may be defined by disposing a color filter on the detector element. The Bayer pattern is often applied to a detector element array, as shown in FIG. 2. According to the Bayer pattern, a set of four detector elements includes one R detector element, one B detector element, and two G detector elements. Although the Bayer pattern is illustrated as an example, this disclosure is not limited to the Bayer pattern.

By way of illustration, when a picture of object 22 is taken by system 20 (FIG. 1), three individual color images (e.g., an R image, a G image, and a B image) are detected by image sensor 26 to form a detected composite color image. The R image is formed by R detector elements, the G image is formed by G detector elements, and the B image is formed by B detector elements (FIG. 2). The three detected individual color images are provided for processing by processor 28 (thus in this example image sensor 26 provides processor 28 the detected color intensity value of each pixel). The processed composite color image is then displayed on display 30.

The three individual color images detected by image sensor 26 may be different from each other, and the difference may be caused by color content of object 22. On the other hand, the difference may be caused by imaging optical element 24 that forms color images differently. It may for example be caused by an inherent characteristic of imaging optical element 24, such as chromatic aberration, or imaging optical element 24 may be intentionally designed to form images differently from different colors.

In an embodiment, processor 28 generates a processed composite color image that modifies three detected individual color images to increase similarity such as by adjusting the sharpness of each color image without significantly altering color content. For example, consider the situation where object 22 is a yellow apple that is imaged by system 20. Recall that red plus green is yellow, so image sensor 26 produces a red individual color image of the yellow apple and a green individual color image of the yellow apple. In this example, assume that the red image of the apple is sharp while the green image of the apple is not sharp, because imaging optical element 24 forms red and green images on different planes (e.g., red and green focal planes) and image sensor 26 is located on the red focal plane. Processor 28 in this example thus generates the processed image by modifying the green image to be as sharp as the red image—as described in the following paragraphs—so that when the processed red and green images are combined, a resulting image of the yellow apple is available that is sharper than the unprocessed image. Yet, the color of the apple will not change noticeably.

Therefore, when an imaging optical element (e.g., a lens) has chromatic aberration, it forms individual red, green, and blue images at different focal lengths, which can make the detected composite color image blurred. To produce a sharp color image, traditionally, a lens is designed to have minimum or reduced chromatic aberration (i.e., an achromatic lens). The focal planes of an achromatic lens for different colors, e.g., its red focal plane, green focal plane, and blue focal plane, are not separated, or are separated by reduced distances, as compared to a lens with chromatic aberration. When the method disclosed herein is utilized, a designer may disregard the chromatic aberration of a lens, since a detected color image, blurred for certain detected colors, can be improved by image processing in a processor. Furthermore, as mentioned previously, the lens may even be designed to have excessive chromatic aberration, in which red, green, and blue focal planes are significantly separated. Like achromatic lens design, lens design techniques that increase chromatic aberration are known in the art. Consequently, detected color images at the focal planes particular to certain colors may be blurred. By applying the method disclosed herein, all detected color images at the red, green, and blue focal planes can be corrected to produce sharp color images in all of the red, green, and blue colors. In other words, as long as a detected image of an imaging system generates an image with at least one color in sharp focus, the use of a lens having chromatic aberration to generate an image that is processed utilizing the method disclosed herein, will effectively extend the depth of focus or depth of field of the imaging system.

The processing by processor 28 is conducted, in an embodiment, by generating a processed image that modifies the detected color intensity value of each pixel of the image data based on detected color intensity values of pixels in its vicinity, to form a processed composite color image. For example, as shown in FIG. 2, a pixel 24 to be processed is affected by all pixels in a 9×9 window 44 that surrounds pixel 42. Pixel 42 is at the center of 9×9 window 44. Windows with other dimensions are also within the scope of this disclosure; for example, certain other possible window dimensions include symmetric or asymmetric, odd or even numbers. The pixel to be processed may not be at the center of an asymmetric window or a window having even number dimension, although the pixel is in the window. Therefore, though a 9×9 window is used in this example, and in some instances may be an optimized and preferred window size window, a different window size may be appropriate and preferred in other situations.

An example showing pixel 42, a pixel of Blue color, at the center of window 44 is illustrated in FIG. 3. Pixel 42 is referred to as $B_{55}$ referring to its position in window 44, as shown. The processed or final value $B_{final}$ of pixel $B_{55}$, also referred to as the processed color intensity value for pixel $B_{55}$, is the sum of weighted color contributions for the selected color (i.e., blue) and the non-selected colors (i.e., red and green). Specifically, $B_{final}$ is a linear combination of the B value detected at pixel $B_{55}$ ($B_B$), a raw color contribution corresponding to R values in the window ($B_R$), and a raw color contribution corresponding to G values in the window ($B_G$):

$$B_{final} = |w_B|^a \cdot B_B + |w_R|^a \cdot B_R + |w_G|^a \cdot B_G, \quad (1)$$

where $|w_B|^a$, $|w_R|^a$, and $|w_G|^a$ are weight factor coefficients of the linear combination, and $w_B$, $w_R$, and $w_G$ are weight factors and are defined as discussed below. Thus, $|w_B|^a \cdot B_B$ is the weighted color contribution corresponding to the blue color detected intensity values in window 44, $|w_R|^a \cdot B_R$ is the weighted color contribution corresponding to the red color detected intensity values in window 44, and $|w_G|^a \cdot B_G$ is the weighted color contribution corresponding to the green color detected intensity values in window 44. The exponent 'a' is a real positive number larger than one. For simplicity and clarity of the description, 'a' is unity in the following examples. In some implementations, 'a' may be 1.2, 1.5, 1.7, 2, 3, ..., or any real positive number equal or larger than one. Increasing the value of 'a' increases contribution from the more focused individual color images to the final image, because as discussed below, the more focused individual color images have larger corresponding weight factors 'w' than the less focused images. Thus, increasing the value of 'a' increases final or composite color image sharpness. However, if the value of 'a' is too large, the composite color image will contain high-frequency noise and/or undesired sharp boundaries. Accordingly, in certain embodiments, 'a' is equal to one, and provides an acceptable compromise between image sharpness and minimal image artifacts.

The B value detected at pixel $B_{55}$ may be considered the initial detected color intensity value of B in contrast to the final or processed color intensity value of B. $B_B$, $B_R$, and $B_G$ are defined by:

$$B_B = B_{55},$$

$$B_R = R^i + \Delta_{RB},$$

$$B_G = G^i + \Delta_{GB}, \quad (2)$$

where $R^i$ is the interpolated R intensity value at the position of $B_{55}$, which is computed from detected intensity values of selected R pixels in the window. Standard or special interpolating functions may be used to compute $R^i$. $G^i$ is the interpolated G intensity value at the position of $B_{55}$, which is computed from detected intensity values selected G pixels in the window. Similarly, standard or special interpolating functions may be used to compute $G^i$.

$\Delta_{RB}$ is a color difference term, which corrects $R^i$ due to the difference of B detected intensity values and R detected intensity values in the window. For example, $\Delta_{RB}$ may be a difference of the mean of B pixel intensity values and the mean of R pixel intensity values in the window or a portion of the window. Similarly, $\Delta_{GB}$ is a color difference term, which corrects $G^i$ due to the difference of B detected intensity values and G detected intensity values in the window. For example, $\Delta_{GB}$ may be a difference of the mean of B pixel intensity values and the mean of G pixel intensity values in the window or a portion of the window. In certain alternate embodiments, each color difference term is the difference between weighted means of two different colors of pixels. For example, in such embodiments, $\Delta_{RB}$ is a difference between the weighted mean of B pixel intensity values and the weighted mean of R pixel intensity values in the window, or in a portion of the window. The means are weighted, for example, based on distance from the pixel being modified, where pixels closer to the modified pixel are given more weight than pixels further from the modified pixel.

In an embodiment, the definition of weight factors determines the output of processor 28. For example, a weight factor may be proportional to the mean gradient of an individual color image in the window. The greater the mean gradient, the larger is the weight factor (in this embodiment). Thus, the one of the three R, G, and B individual color images that has the greatest mean gradient will have a greater contribution to the final processed color intensity value of the selected pixel value (i.e., Eq. (1)) than that of the other two individual color images having smaller mean gradients. On the other hand, an individual color image with a lesser mean gradient will have lesser contribution. As a result, the final three processed images will all have large mean gradients. In other words, in a processed window, if one of the three R, G, and B individual color images is sharp (having the largest mean gradient) while the other individual color images are not sharp (having smaller mean gradients), all the final processed R, G, and B images in the window will finally be sharp (having larger mean gradients).

For example, the weight factors may be defined by:

$$w_B = \frac{B_{grad}}{B_{grad} + R_{grad} + G_{grad}}, \quad (3)$$

$$w_R = \frac{R_{grab}}{B_{grad} + R_{grad} + G_{grad}},$$

$$w_G = \frac{G_{grad}}{B_{grad} + R_{grad} + G_{grad}},$$

where grad stands for gradient. $B_{grad}$, $R_{grad}$, and $G_{grad}$ are mean gradients of the detected color intensity values of the B, R, and G pixels in the window, respectively. For example, $$B_{grad} = \frac{1}{2}(B_{grad}^V + B_{grad}^H), \quad (4)$$

where V and H stand for vertical and horizontal, respectively. Referring to FIG. 3, $$B_{grad}^H = \frac{1}{20}(|B_{11}-B_{12}|+|B_{12}-B_{15}|+\ldots+|B_{95}-B_{97}|+ |B_{97}-B_{99}|), \quad (5)$$

and $$B_{grad}^V = \frac{1}{20}(|B_{11}-B_{31}|+|B_{31}-B_{51}|+\ldots+|B_{59}-B_{79}|+ |B_{79}-B_{99}|), \quad (6)$$

For simplicity, Eqs. (5) and (6) do not list all twenty gradient terms in the brackets. Referring to FIG. 3, $R_{grad}$ and $G_{grad}$ may also be formulated in the same way, replacing all of the B values with R and G values respectively. Alternatively, Eqs. (5) and (6) may consist of selected gradient terms only.

In this way, the processed color intensity value at $B_{55}$ or pixel 42, which is $B_{final}$, can be obtained. $B_{final}$ may optionally be normalized. Similar processes with adjusted procedures may be repeated for all or most pixels for all individual color images.

In another embodiment, a weight factor may be proportional to the magnitude of an inner product of a high frequency mask and detected color intensity values of an individual color image in the window for a mask effectively smaller than the window, or detected color intensity values of an individual color image in an extended widow for a mask that is effectively larger than the window. The high frequency mask is used to extract an image's high frequency content. In particular, the inner product of the high frequency mask and detected color intensity values of a given image provides the image's high frequency content, as defined by the mask. For example, an inner product of a single frequency cosine mask and detected color intensity values of an image will extract a cosine component of the image at the mask's frequency.

An image with a large high frequency content will typically be sharper than an image with a small high frequency content. Accordingly, an inner product of the high frequency mask and detected color intensity values of a given image may indicate relative image sharpness, and therefore, the higher the inner product, the larger the weight factor associated with the image. Thus, the one of the three individual R, G, and B color images that has the highest inner product will have a greater contribution to the final processed color intensity value (i.e., Eq. (1)) than that of the other two individual color images. On the other hand, an individual color image having a lower inner product will have a smaller contribution accordingly. As a result, the final three processed images will have high inner products. In other words, in a processed window, if one of the three R, G, and B individual color images is sharp (having a high inner product with a high frequency mask) while the other images are not sharp (having lower inner products with the high frequency mask), all the final, processed R, G, and B images in the window will be sharp (having high inner products with the high frequency mask).

For example, the weight factors may be defined by:

$$w_B = \frac{|B_{IP}|}{|B_{IP}| + |R_{IP}| + |G_{IP}|}, \quad (7)$$

$$w_R = \frac{|R_{IP}|}{|B_{IP}| + |R_{IP}| + |G_{IP}|},$$

$$w_G = \frac{|G_{IP}|}{|B_{IP}| + |R_{IP}| + |G_{IP}|},$$

where IP stands for inner product. $B_{IP}$, $R_{IP}$, and $G_{IP}$ are the inner products of the detected color intensity values of the B, R, and G pixels and a high frequency mask, respectively. For example, a 5×5 high frequency mask is given as follows:

$$M_{HF} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \\ m_{41} & m_{42} & m_{43} & m_{44} & m_{45} \\ m_{51} & m_{52} & m_{53} & m_{54} & m_{55} \end{pmatrix} = \begin{pmatrix} -1 & -3 & -4 & -3 & -1 \\ -3 & -2 & 6 & -2 & -3 \\ -4 & 6 & 28 & 6 & -4 \\ -3 & -2 & 6 & -2 & -3 \\ -1 & -3 & -4 & -3 & -1 \end{pmatrix} \quad (8)$$

The high frequency mask $M_{HF}$ is a fixed mask independent of the high frequency components of individual R, G, or B color images. The high frequency mask typically has a periodic and symmetrical two-dimensional pattern, such as shown in the example of equation (8). Of course, other high frequency masks, such as a mask having a cosine pattern, may be used as well. The high frequency components extracted by a given high frequency mask are determined from the Fourier transform of the mask.

Inner product of two continuous functions A(x,y) and B(x, y) is given as follows:

Inner Product=∬A(x,y)B(x,y)dxdy. (9)

If $A_{ij}$ and $B_{ij}$ are discrete functions, the inner product is, $$\text{Inner Product} = \sum_{i,j} A_{ij} B_{ij}. \quad (10)$$

Referring to FIG. 3, the mask may be scaled such that B pixels match the mask, and pixel $B_{55}$ is at the center of the mask. Accordingly, $B_{IP}$ may be defined by:

$$B_{IP} = m_{11}B_{11} + m_{12}B_{13} + m_{13}B_{15} + m_{14}B_{17} + \quad (11)$$
$$m_{15}B_{19} + m_{21}B_{31} + m_{22}B_{33} + m_{23}B_{35} + m_{24}B_{37} +$$
$$m_{25}B_{39} + m_{31}B_{51} + m_{32}B_{53} + m_{33}B_{55} + m_{34}B_{57} +$$
$$m_{35}B_{59} + m_{41}B_{71} + m_{42}B_{73} + m_{43}B_{75} + m_{44}B_{77} +$$
$$m_{45}B_{79} + m_{51}B_{91} + m_{52}B_{93} + m_{53}B_{95} + m_{54}B_{97} + m_{55}B_{99}$$

Referring to FIG. 3, to calculate $R_{IP}$, the scaled mask $M_{HF}$ may be shifted relative to window 44 such that a R pixel close to pixel $B_{55}$ is at the center of the scaled mask. For example, the scaled mask may be shifted relative to window 44 such that $R_{66}$ is at the center of the mask. Accordingly, $R_{IP}$ may be defined by:

$$R_{IP} = m_{11}R_{22} + m_{12}R_{24} + m_{13}R_{26} + m_{14}R_{28} + m_{15}R_{210} + \quad (12)$$
$$m_{21}R_{42} + m_{22}R_{44} + m_{23}R_{46} + m_{24}R_{48} + m_{25}R_{410} +$$
$$m_{31}R_{62} + m_{32}R_{64} + m_{33}R_{66} + m_{34}R_{68} + m_{35}R_{610} +$$
$$m_{41}R_{82} + m_{42}R_{84} + m_{43}R_{86} + m_{44}R_{88} + m_{45}R_{810} +$$
$$m_{51}R_{102} + m_{52}R_{104} + m_{53}R_{106} + m_{54}R_{108} + m_{55}R_{1010}$$

Again referring to FIG. 3, to calculate $G_{IP}$, the scaled mask $M_{HF}$ may be shifted relative to window 44 such that a G pixel close to pixel $B_{55}$ is at the center of the scaled mask. For example, the scaled mask may be shifted relative to window 44 such that $G_{56}$ is at the center of the mask. To match the scaled mask, a column between two selected columns of G pixels must be omitted. Accordingly, $G_{IP}$ may be defined by:

$$G_{IP} = m_{11}G_{12} + m_{12}G_{14} + m_{13}G_{16} + m_{14}G_{18} + m_{15}G_{110} + \quad (13)$$
$$m_{21}G_{32} + m_{22}G_{34} + m_{23}G_{36} + m_{24}G_{38} + m_{25}G_{310} +$$
$$m_{31}G_{52} + m_{32}G_{54} + m_{33}G_{56} + m_{34}G_{58} + m_{35}G_{510} +$$
$$m_{41}G_{72} + m_{42}G_{74} + m_{43}G_{76} + m_{44}G_{78} + m_{45}G_{710} +$$
$$m_{51}G_{92} + m_{52}G_{94} + m_{53}G_{96} + m_{54}G_{98} + m_{55}G_{910}$$

Alternatively, $R_{IP}$ in Eq. (7) may be an average of several values of $R_{IP}$ as shown in Eq. (12), for example, values when pixel $R_{44}$, $R_{46}$, $R_{64}$, $R_{66}$ are at the center of the mask, respectively. In one embodiment, $R_{IP}$ in Eq. (7) is an average of several values of $R_{IP}$ as shown in Eq. (12), with the high frequency mask centered at two or more locations less than ten pixels horizontally and/or vertically away from pixel $B_{55}$. Similarly, $G_{IP}$ in Eq. (7) may be an average of several values of $G_{IP}$ as shown in Eq. (13), for example, values when pixel $G_{45}$, $G_{54}$, $G_{56}$, $G_{65}$ are at the center of the mask, respectively. In one embodiment, $G_{IP}$ in Eq. (7) is an average of several values of $G_{IP}$ as shown in Eq. (13) with the high frequency mask centered at two or more locations less than ten pixels horizontally and/or vertically away from pixel $B_{55}$. In some implementation, $B_{IP}$ in Eq. (7) may also be an average of several values of $B_{IP}$ as shown in Eq. (11), for example, values when pixel $B_{55}$, $B_{53}$, $B_{57}$, $B_{35}$, $B_{75}$ are at the center of the mask, respectively. In one embodiment, $B_{IP}$ in Eq. (7) is an average of several values of $B_{IP}$ as shown in Eq. (11) with the high frequency mask centered at two or more locations less than ten pixels horizontally and/or vertically away from pixel $B_{55}$.

In this way, the processed color intensity value at $B_{55}$ or pixel 42, which is $B_{final}$, can be obtained. $B_{final}$ may optionally be normalized. Similar processes with adjusted procedures may be repeated for all or most pixels of the blue, red, and green individual color images to form a processed composite color image.

In yet another embodiment, the weight factor may be proportional to the local contrast of the respective individual color image in the window. The greater is the local contrast, the larger is the weight factor. Thus, one of the three R, G, and B individual images that has the greatest local contrast will have more contribution to the processed color intensity value (i.e., Eq. (1)) than that of the other two color images having lower local contrast. On the other hand, an individual color image having lower local contrast will have a lower contribution accordingly. As a result, the three processed images will all have high local contrast. In other words, in a processed window, if one of the three individual, detected R, G, and B color images is sharp (having high local contrast) while the other images are not sharp (having low local contrast), all the processed R, G, and B images in the window will be sharp (having high local contrast).

For example, the weight factors may be defined:

$$w_B = \frac{B_{LC}}{B_{LC} + R_{LC} + G_{LC}}, \quad (14)$$
$$w_R = \frac{R_{LC}}{B_{LC} + R_{LC} + G_{LC}},$$
$$w_G = \frac{G_{LC}}{B_{LC} + R_{LC} + G_{LC}},$$

where LC stands for local contrast. $B_{LC}$, $R_{LC}$, and $G_{LC}$ are the local contrasts of B, R, and G pixels, respectively.

For example, a local contrast of B pixels in a window may be derived as follows. First, a mean $M_B$ of the color intensity values of B pixels in the window is determined. Then B pixels in the window are divided into two groups, Group1 and Group2, as follows:

$$B_{ij} = \in \begin{cases} \text{Group1,} & \text{if } B_{ij} > M_B \\ \text{Group1,} & \text{if } B_{ij} \le M_B. \end{cases} \quad (15)$$

The local contrast of B image may be defined by:

$$B_{LC} = M_B(\text{Group1}) - M_B(\text{Group2}), \quad (16)$$

where $M_B$(Group1) and $M_B$(Group2) are means of the color intensity values of B pixels in Group1 and Group2, respectively. Other definitions of local contrast are possible.

$R_{LC}$ and $G_{LC}$ may also be formulated in the same way. In this way, a processed color intensity value at $B_{55}$ or pixel 42, which is $B_{final}$, can be obtained. $B_{final}$ may optionally be normalized. Similar processes with adjusted procedures may be repeated for all or most pixels of the blue, red, and green individual color images to form a processed composite color image.

For further examples, a window 54 for modifying pixel 52, which is a R pixel, is shown in FIG. 4. A window 64 for modifying pixel 62, which is a G pixel having horizontal neighboring B pixels, is shown in FIG. 5. For pixel 72, which is a G pixel having horizontal neighboring R pixels, a window 74 is shown in FIG. 6. The processes are similar to the example of B pixel given above although each procedure may be adjusted accordingly, such as for which color is selected (i.e., red in the FIG. 4 example and green in FIGS. 5 and 6 example) and for which colors are nonselected (i.e., green and blue in the FIG. 4 example and red and blue in the FIGS. 5 and 6 example).

Embodiments and/or methods described above show some examples of possible embodiments and/or methods. Other embodiments and/or methods for defining weight factors are possible. An advantage of the aforementioned methods is that no knowledge of relative sharpness among R, G, and B individual color images is required to restore all of the R, G, and B images to provide sharp images in each color.

Although it is assumed that the exponent 'a' of Eq. (1) is one in examples described above, it is appreciated that examples described above can be applied to the case for 'a' being any positive real number equal or larger than one, e.g., a=1.2, 1.5, 1.7, 2, 3, . . . .

Figure 7A:
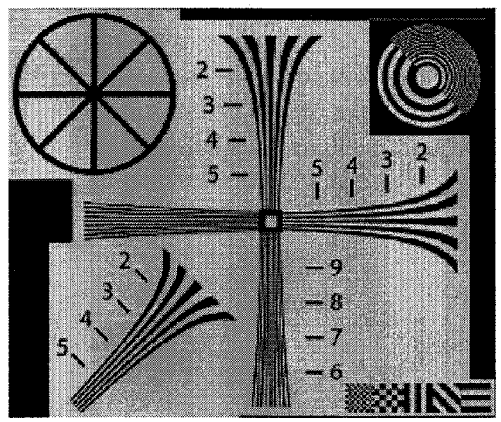
FIG. 7(a) shows one exemplary blue image before processing.
Figure 7B:
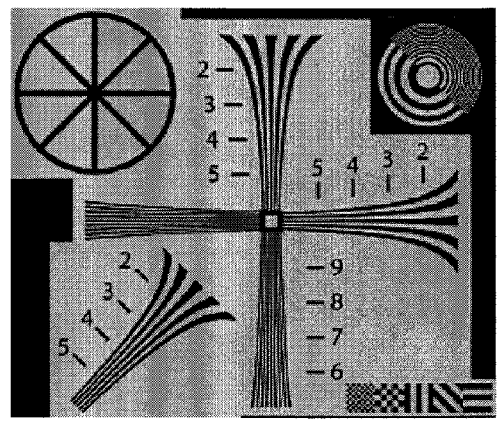
FIG. 7(b) shows the blue image of FIG. 7(a) after processing.
Figure 8A:
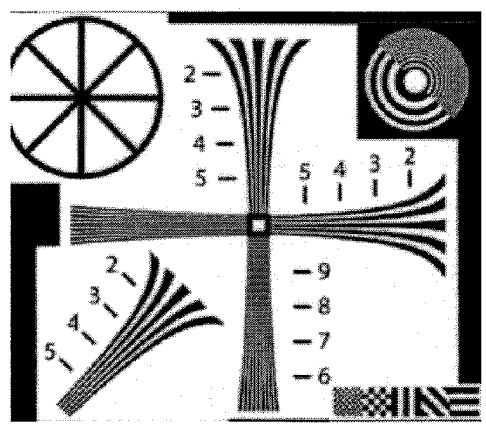
FIG. 8(a) shows one exemplary green image before processing.
Figure 8B:
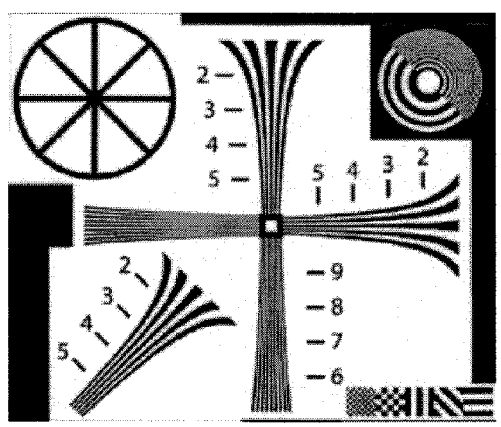
FIG. 8(b) shows the green image of FIG. 8(a) after processing.

For illustration, FIGS. 7-10 show images before and after processing based on a mean gradient algorithm described above (Equations 3-6). The input, detected composite color image is illustrated in FIG. 10($a$). The input color image is 1340×1133 in size (counting each color separately) and has 256 levels. The blue individual color image formed by blue pixels is extracted from the composite color image, which is shown in FIG. 7($a$). The extracted blue image is 670×566 in size and has 256 levels. Similarly, a green individual color image formed by green pixels is extracted from the composite color image, which is shown in FIG. 8($a$). The extracted green image is 670×566 in size and has 256 levels. Notice that there are two green images, each of them is 670×566 in size. The red individual color image formed by red pixels is extracted from the color image, which is shown in FIG. 9($a$). The extracted red image is 670×566 in size and has 256 levels.

FIG. 7($a$) shows a sharp image, indicating that the object is focused at or near the blue wavelength, while FIG. 9($a$) shows a blurred image, indicating that the object is out of focus at the red wavelength. FIG. 8($a$) shows the quality of a green image is in between of those of the blue and red images. After processing based on a mean gradient algorithm, the processed blue image is essentially unchanged as shown in FIG. 7($b$), the processed red image is significantly enhanced as shown in FIG. 9($b$), and the processed green image is also enhanced as shown in FIG. 8($b$). The processed blue, green, and red images are then combined, resulting in a color output or processed composite color image, which is shown in FIG. 10($b$). In conclusion, a blurred color image shown in FIG. 10($a$) is restored or deblurred to produce a sharp color image shown in FIG. 10($b$).

Combinations of Features

Features described above as well as those claimed below may be combined in various ways without departing from the scope hereof. The following examples illustrate some possible combinations:

(A1) A method for processing a detected composite color image to form a processed composite color image may include detecting the detected composite color image as a plurality of individual color images, each individual color image including detected color intensity values for one of a plurality of detected colors, for each of a plurality of pixels in the image. For each given pixel in the detected composite color image, the method may include identifying a window of pixels in the detected composite color image, that surrounds the given pixel. For a selected color of the plurality of individual color images, the other colors of the plurality of detected colors being nonselected colors, the method may include: (i) calculating a weight factor coefficient for each of the plurality of detected colors for the given pixel, from the detected color intensity values of the pixels that surround the given pixel, (ii) calculating raw color contributions corresponding to each of the nonselected colors, (iii) multiplying each of the detected color values of the selected color and the raw color contributions corresponding to the nonselected colors, with corresponding weight factor coefficients, to form weighted color contributions, and (iv) summing the weighted color contributions to form a processed color intensity value for the selected color for the given pixel. The method may be performed for the processed color intensity values for all of the plurality of detected colors, and for all of the plurality of pixels in the image, to form the processed composite color image.

(A2) In the method denoted as (A1), calculating the weight factor coefficient for each of the plurality of detected colors for the given pixel may include raising an absolute value of a weight factor for each of the plurality of detected colors to the power of a common exponent that is a real positive number, to form each of the weight factor coefficients.

(A3) In the method denoted as (A2), the common exponent may be equal to one.

(A4) In any of the methods denoted as (A1) through (A3), calculating the weight factor coefficient may include calculating respective weight factors for each of the plurality of detected colors for the given pixel that are proportional to respective mean gradients of the color intensity values, within the window, of the respective colors.

(A5) In any of the methods denoted as (A1) through (A3), calculating the weight factor coefficient may include calculating the weight factor for the selected color as proportional to a magnitude of an inner product of a high frequency mask with detected color intensity values for the selected color, centered at the given pixel.

(A6) In any of the methods denoted as (A1) through (A3) or (A5), calculating the weight factor coefficient may include calculating the weight factors for the respective nonselected colors as proportional to magnitudes of an inner product of a high frequency mask with detected color intensity values for the respective nonselected colors, centered at a pixel of the respective nonselected color pixel that is nearest to the given pixel.

(A7) In any of the methods denoted as (A1) through (A3) or (A6), calculating the weight factor coefficient may include calculating the weight factor for the selected color as proportional to an average of magnitudes of an inner product of a high frequency mask with detected color intensity values for the selected color, centered at a plurality of locations that are less than ten pixels horizontally and/or vertically from the given pixel.

(A8) In any of the methods denoted as (A1) through (A3), (A5), or (A7), calculating the weight factor coefficient may include calculating the weight factors for the respective nonselected colors as proportional to an average of magnitudes of an inner product of a high frequency mask with detected color intensity values for the respective nonselected colors, centered at a plurality of locations that are less than ten pixels horizontally and/or vertically from the given pixel.

(A9) In any of the methods denoted as (A1) through (A3), calculating the weight factor coefficient may include calculating each of the weight factors for the respective colors as proportional to a local contrast of the pixels of the respective color that are within the window.

(A10) In the method denoted as (A9), calculating the weight factor coefficient may include calculating the local contrast for a given one of the respective colors as a difference of a mean of color intensity values of pixels in a first group and a mean of color intensity values of pixels in a second group, for the respective color, where (a) the first group consists of pixels of the respective color and within the window having color intensity values greater than a mean of color intensity values of pixels of the respective color and within the window, and (b) the second group consisting of pixels of the respective color and within the window having color intensity values less than or equal to the mean of color intensity values of pixels of the respective color and within the window.

(A11) In any of the methods denoted as (A1) through (A10), calculating the raw color contributions corresponding to each of the nonselected colors may include: (a) interpolating intensity values for each of the nonselected colors at a position of the given pixel, to form interpolated intensity values for each of the nonselected colors at the position; (b) calculating respective selected color difference terms for each of the nonselected colors with respect to the selected color, and (c) adding the respective selected color difference terms for each of the nonselected colors to the corresponding interpolated intensity values of each of the nonselected colors, to form the raw color contributions corresponding to each of the nonselected colors.

(A12) In the method denoted as (A11), calculating the respective selected color difference terms for each of the nonselected colors with respect to the selected color may include: (a) calculating each of the respective selected color difference terms as a difference between (1) a mean of the detected color intensity values of the selected color, within the window, and (2) a mean of the detected color intensity values of each respective nonselected color, within the window.

Apparatus implementing cross-color image processing may implement any of the methods denoted above as (A1) through (A12).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for processing a detected composite color image to form a processed composite color image, comprising:
    detecting the detected composite color image as a plurality of individual color images, each individual color image comprising detected color intensity values for one of a plurality of detected colors, for each of a plurality of pixels in the image;
    and, for each given pixel in the detected composite color image:
        identifying a window of pixels in the detected composite color image, that surrounds the given pixel;
    and, for a selected color of the plurality of individual color images, the other colors of the plurality of detected colors being nonselected colors:
        calculating a weight factor coefficient for each of the plurality of detected colors for the given pixel, from the detected color intensity values of the pixels that surround the given pixel,
        calculating raw color contributions corresponding to each of the nonselected colors,
        multiplying each of the detected color values of the selected color and the raw color contributions corresponding to the nonselected colors, with corresponding weight factor coefficients, to form weighted color contributions, and
        summing the weighted color contributions to form a processed color intensity value for the selected color for the given pixel;
    wherein the processed color intensity values for all of the plurality of detected colors, for all of the plurality of pixels in the image, form the processed composite color image.

2. The method of claim 1, wherein calculating the weight factor coefficient for each of the plurality of detected colors for the given pixel comprises raising an absolute value of a weight factor for each of the plurality of detected colors to the power of a common exponent that is a real positive number equal to or larger than one, to form each of the weight factor coefficients.

3. The method of claim 2, wherein calculating the weight factor coefficient comprises calculating respective weight factors for each of the plurality of detected colors for the given pixel that are proportional to respective mean gradients of the color intensity values, within the window, of the respective colors.

4. The method of claim 2, wherein calculating the weight factor coefficient comprises calculating the weight factor for the selected color as proportional to a magnitude of an inner product of a high frequency mask with detected color intensity values for the selected color, centered at the given pixel.

5. The method of claim 2, wherein calculating the weight factor coefficient comprises calculating the weight factors for the respective nonselected colors as proportional to magnitudes of an inner product of a high frequency mask with detected color intensity values for the respective nonselected colors, centered at a pixel of the respective nonselected color pixel that is nearest to the given pixel.

6. The method of claim 2, wherein calculating the weight factor coefficient comprises calculating the weight factor for the selected color as proportional to an average of magnitudes of an inner product of a high frequency mask with detected color intensity values for the selected color, centered at a plurality of locations that are less than ten pixels horizontally and/or vertically from the given pixel.

7. The method of claim 2, wherein calculating the weight factor coefficient comprises calculating the weight factors for the respective nonselected colors as proportional to an average of magnitudes of an inner product of a high frequency mask with detected color intensity values for the respective nonselected colors, centered at a plurality of locations that are less than ten pixels horizontally and/or vertically from the given pixel.

8. The method of claim 2, wherein calculating the weight factor coefficient comprises calculating each of the weight factors for the respective colors as proportional to a local contrast of the pixels of the respective color that are within the window.

9. The method of claim 8, wherein calculating the weight factor coefficient comprises calculating the local contrast for a given one of the respective colors as a difference of a mean of color intensity values of pixels in a first group and a mean of color intensity values of pixels in a second group, for the respective color,
   the first group consisting of pixels of the respective color and within the window having color intensity values greater than a mean of color intensity values of pixels of the respective color and within the window, and
   the second group consisting of pixels of the respective color and within the window having color intensity values less than or equal to the mean of color intensity values of pixels of the respective color and within the window.

10. The image processing method of claim 2, wherein the common exponent is equal to one.

11. The method of claim 1, wherein calculating the raw color contributions corresponding to each of the nonselected colors comprises:
   interpolating intensity values for each of the nonselected colors at a position of the given pixel, to form interpolated intensity values for each of the nonselected colors at the position;
   calculating respective selected color difference terms for each of the nonselected colors with respect to the selected color, and
   adding the respective selected color difference terms for each of the nonselected colors to the corresponding interpolated intensity values of each of the nonselected colors, to form the raw color contributions corresponding to each of the nonselected colors.

12. The method of claim 11, wherein calculating the respective selected color difference terms for each of the nonselected colors with respect to the selected color comprises:
   calculating each of the respective selected color difference terms as a difference between
      a mean of the detected color intensity values of the selected color, within the window, and
      a mean of the detected color intensity values of each respective nonselected color, within the window.

13. A method for processing detected color intensity values of pixels of a detected composite color image to form a processed composite color image, the detected composite color image comprising a plurality of individual color images, each individual color image comprising detected color intensity values for one of a plurality of detected colors, for each of a plurality of pixels in the image, the method comprising:
   for each pixel in the detected composite color image;
      identifying a window of pixels in the detected composite color image, that surrounds the given pixel;
      and, for a selected color of the plurality of individual color images, the other colors of the plurality of detected colors being nonselected colors:
         calculating a weight factor coefficient for each of the plurality of detected colors for the given pixel, from the detected color intensity values of the pixels that surround the given pixel,
         calculating raw color contributions corresponding to each of the nonselected colors,
         multiplying each of the detected color values of the selected color and the raw color contributions corresponding to the nonselected colors, with corresponding weight factor coefficients, to form weighted color contributions, and
         summing the weighted color contributions to form a processed color intensity value for the selected color for the given pixel;
   wherein the processed color intensity values for all of the plurality of detected colors, for all of the plurality of pixels in the image, form the processed composite color image.

14. The method of claim 13 wherein calculating the raw color contributions corresponding to each of the nonselected colors comprises:
   interpolating intensity values for each of the nonselected colors at a position of the given pixel, to form interpolated intensity values for each of the nonselected colors at the position;
   calculating respective selected color difference terms for each of the nonselected colors with respect to the selected color, and
   adding the respective selected color difference terms for each of the nonselected colors to the corresponding interpolated intensity values of each of the nonselected colors, to form the raw color contributions corresponding to each of the nonselected colors.

15. An imaging module, comprising:
   an imaging optical element, an image sensor, and an image processor;
   the imaging optical element forming an image of an object on the image sensor,
   the image sensor comprising a plurality of detector elements that are each sensitive to one of a first color, a second color, and a third color, each of the detector elements detecting light intensity of the respective color and providing a detected color intensity value in response thereto, the detected color intensity values of all detector elements for a given color forming an individual color image for the corresponding color, and the individual color images for the first, second and third colors forming a detected composite color image;
   the processor implementing a process that forms a processed composite color image by:
      identifying a window of pixels in the detected composite color image, that surrounds the given pixel;
      and, for a selected color of the plurality of individual color images, the other colors of the plurality of detected colors being nonselected colors:
         calculating a weight factor coefficient for each of the plurality of detected colors for the given pixel, from the detected color intensity values of the pixels that surround the given pixel,
         calculating raw color contributions corresponding to each of the nonselected colors,
         multiplying each of the detected color values of the selected color and the raw color contributions corresponding to the nonselected colors, with corresponding weight factor coefficients, to form weighted color contributions, and
         summing the weighted color contributions to form a processed color intensity value for the selected color for the given pixel;
   such that the processed color intensity values for all of the plurality of detected colors, for all of the plurality of pixels in the image, form the processed composite color image.

16. The imaging module of claim 15 wherein calculating the raw color contributions corresponding to each of the nonselected colors comprises:

interpolating intensity values for each of the nonselected colors at a position of the given pixel, to form interpolated intensity values for each of the nonselected colors at the position;

calculating respective selected color difference terms for each of the nonselected colors with respect to the selected color, and adding the respective selected color difference terms for each of the nonselected colors to the corresponding interpolated intensity values of each of the nonselected colors, to form the raw color contributions corresponding to each of the nonselected colors.

17. The imaging module of claim 15 wherein the imaging optical element has chromatic aberration.

* * * * *

UNITED STATES PATENT AND TRADEMARK OFFICE
CERTIFICATE OF CORRECTION

PATENT NO. : 8,457,393 B2
APPLICATION NO. : 13/179488
DATED : June 4, 2013
INVENTOR(S) : Guansong Liu et al.

It is certified that error appears in the above-identified patent and that said Letters Patent is hereby corrected as shown below:

In the Specification

Column 5, Line 48, "a pixel 24" should read --a pixel 42--.

Column 7, Lines 37 and 38,

" $B_{grad}=\frac{1}{2}(B_{grad}^{V}+B_{grad}^{H})$,                           (4),"

should read

-- $B_{grad}=\frac{1}{2}(B_{grad}^{V}+B_{grad}^{H})$,                           (4) --.

Column 7, Lines 41 and 42,

" $B_{grad}^{H}=\frac{1}{20}(|B_{11}-B_{12}|+|B_{12}-B_{15}|+\ldots+|B_{95}-B_{97}|+|B_{97}-B_{99}|)$,                           (5),"

should read

-- $B_{grad}^{H}=\frac{1}{20}(|B_{11}-B_{12}|+|B_{12}-B_{15}|+\cdots+|B_{95}-B_{97}|+|B_{97}-B_{99}|)$,                           (5) --.

Column 7, Lines 46 and 47,

" $B_{grad}^{V}=\frac{1}{20}(|B_{11}-B_{31}|+|B_{31}-B_{51}|+\ldots+|B_{59}-B_{79}|+|B_{79}-B_{99}|)$,                           (6),"

should read

-- $B_{grad}^{V}=\frac{1}{20}(|B_{11}-B_{31}|+|B_{31}-B_{51}|+\cdots+|B_{59}-B_{79}|+|B_{79}-B_{99}|)$,                           (6) --.

Signed and Sealed this
Eleventh Day of November, 2014

Michelle K. Lee
*Deputy Director of the United States Patent and Trademark Office*